Patented July 9, 1929.

1,719,948

UNITED STATES PATENT OFFICE.

MERWYN C. TEAGUE, OF ELMHURST, NEW YORK, ASSIGNOR TO GENERAL RUBBER COMPANY, OF NEW YORK, N. Y., A CORPORATION OF NEW JERSEY.

ADHESIVE RUBBER COMPOSITION.

No Drawing. Application filed September 18, 1924. Serial No. 738,553.

This invention relates to a new and improved composition of matter and more particularly an adhesive composition containing rubber.

Various adhesive compositions have heretofore been proposed and used in the arts generally, for instance in making single and double textures, in securing backings to facing material, in cementing the welts to shoe soles, in pasting labels on containers, in joining the margins of bags, etc. The present invention aims primarily to provide a new and improved adhesive composition which may be widely varied in character but in its preferred form is viscous, stringy, smooth, and tacky, the latter whether partially or completely dried on the materials to be secured together or treated therewith. The improved composition is cheaper than rubber cements heretofore used, is not inflammable, and has good ageing properties both before and after application.

With the preferred embodiment in mind and without intention to limit its scope more than is required by the prior art, the invention briefly stated consists in an intermixture of an aqueous dispersion of rubber and the resinous polymerization products of the middle fractions of coal tar, preferably fractions between 150° C. and 200° C., and desirably also a thickening and stabilizing agent for modifying the viscosity of the composition. Generally it is preferred to increase the penetrating power of the composition by incorporating water soluble sulphonated vegetable oils.

In carrying out the invention an adhesive composition may be prepared by emulsifying in water cumaron resin, which is a mixture of Pará-cumaron and Pará-indene and the polymerized homologues of cumaron and indene, the resin having a melting point between 20° and 100° C., preferably 40° C., and adding it to rubber latex. The emulsion of cumaron resin may be prepared as convenient, for instance by melting the cumaron resin by heat and subsequently adding a small percentage of a mineral oil such as a medium spindle oil in order to dissolve and dilute the resin and dispersing the solution in water in the presence of an emulsifying agent such as soap. Dispersion can be accomplished by means of a colloid mill or other mixing machine. Any mineral oil can be substituted for the spindle oil although it is desirable to use a non-volatile oil. The mineral oil can be dispensed with and the heated resin dispersed in water. While the proportions may be widely varied to meet the requirements of the use to which the adhesive is to be put, the following forms an adhesive composition suitable for some purposes:—

|  | Parts by weight. |
|---|---|
| Water | 250 |
| Cumaron resin | 20 |
| Spindle oil | 14 |
| Rubber (in the form of latex containing 33% solids) | 100 |
| Water soluble soap | .5 |

The viscosity of the composition may be modified and controlled by the addition of thickening and stabilizing agents which can be added to latex without upsetting its stability, that is, such gums for instance as tragacanth, Arabic, Senegal, Karaya and agar-agar, Iceland moss, Irish moss, casein, saponin; or such chemical thickeners and stabilizers for rubber dispersions as sodium silicate which is disclosed in a pending application Serial No. 720,732, filed June 9, 1924. 2–5 grams of Karaya gum for instance may be soaked in about 100 ccs. of water and a gel thereby obtained. The cumaron resin is emulsified while melted, preferably in the presence of a small proportion, around 1.0%, of a protective colloid such as glue and in the presence of a small quantity, around 0.5%, of an emulsifying agent such as sodium or potassium oleate or equivalent soap. Any suitable apparatus may be employed to effect the emulsification such as a colloid mill. While the emulsion of cumaron resin is still hot, it is combined with the gel of the Karaya gum in water in a high speed emulsifier to secure a thorough intermixture. After the emulsion of cumaron resin and the gel of Karaya gum have been intermixed the mixture is allowed to cool to room temperatures before being added to the latex. Upon cooling the mixture is added to the latex with gentle agitation and preferably the composition is allowed to age four or six hours. While the proportions of the ingredients may be varied widely to meet the requirements of the contemplated use, the following has been found satisfactory and is given for the sake of illustration:

|  | Parts by weight. |
|---|---|
| Water | 260 |

|  | Parts dry by weight. |
|---|---|
| Karaya gum | 2–5 |

|  | Parts by weight. |
|---|---|
| Cumaron resin | 25 |
| Spindle oil | 17 |
| Rubber in the form of latex containing 33% solids | 100 |
| Glue | ¾ |
| Water soluble soap | ⅜ |

A composition so prepared is remarkably stringy, quite sticky or tacky when dried, smooth and viscous, and as it is suitable for a wide variety of uses is the preferred form of the composition.

Generally stated the function of the cumaron resin is to render the product sticky. The Karaya gum, if used, as is preferable, makes the composition smooth, stringy and more viscous. By suitably governing the proportions of Karaya gum the viscosity and limpidity of the composition may be controlled. Karaya gum apparently increases the tackiness producing action of the cumaron resin on the rubber without at the same time decreasing the stability of the composition.

Preferably but not necessarily, a water soluble oil such as sulphonated castor oil, may be used in addition to the spindle oil (which is not soluble in water) to increase the penetrating power of the adhesive composition and thereby to better the anchorage of the adhesive to the material (leather, fabric, etc.) to which it is to be applied. In some cases also a water soluble sulphonated vegetable oil may be used in place of the spindle oil. If a sulphonated vegetable oil is employed, it may be used in quantities suitable to obtain the maximum adhesion such as approximately 5 parts by weight on 100 parts by weight of rubber.

Fillers, vulcanizing agents, and preservatives, may be and preferably are used as desired to enhance the qualities of the final composition and to suit the particular requirements of the use to which the adhesive is to be put. Such fillers as whitings, barytes, clays, iron oxides, and the like may be employed. They are preferably formed into a paste with water intermixed with the latex. Of course the quantities introduced may be varied and preferably left to the discretion of the manufacturer. Vulcanizing agents such as sulphur may be, and desirably are employed where a vulcanized union is wanted in the materials to be secured together or treated and sulphur alone or with accelerators such as zinc oxide, litharge, organic accelerators, or other agents may be incorporated in the composition, preferably as with fillers by forming into a paste with water and adding the same to the rubber latex. To prevent putrefaction a preservative such as sodium fluoride, phenol, sodium benzoate, or similar materials, may be added to the composition after it has been completed or during its manufacture as convenient. Only small percentages—up to about one-half of one per cent in the case of sodium fluoride—of such preservatives are necessary. By way of example only, a satisfactory adhesive composition containing fillers, vulcanizing agents and preservatives can have the following composition:

|  | Parts by weight. |
|---|---|
| Rubber in the form of latex containing 33% solids | 100 |
| Cumaron resin | 25 |
| Spindle oil | 14 |
| Karaya gum | .17 |
| Glue | .67 |
| Sodium oleate | .67 |
| Phenol | .33 |
| Sulphonated castor oil | 2 |
| Gilder's whiting | 25 |
| Sulphur | 5 |
| Zinc oxide | 1 |

The adhesive composition of the present invention may be widely varied in its physical characteristics by changes in the proportions of the ingredients but in its preferred form the composition is stringy, sticky when dried, smooth, viscous, and stable. The tackiness of the composition is quite remarkable and it is to be noted that the tackiness persists whether the composition has been dried (by complete evaporation of the water content or liquid menstruum) or is only partially dried. This characteristic is quite valuable for manufacturing purposes since it enables production to be speeded up.

While it is preferred to employ rubber latex in a natural, diluted or concentrated form, any aqueous dispersion of rubber, such as artificially prepared latex, may be employed, and the claims are to be so understood.

In the above it has been endeavored to set forth the invention with sufficient particularity to enable one skilled in the art to practice the same but it is to be understood that the invention is believed to be broad in scope and is not intended to be limited to the specific ingredients and proportions above set forth in detail. It is preferred to employ the resinous products of the partial or complete polymerization of certain aromatic carbon compounds, particularly indene, cumaron, and their isomers. These compounds are produced as such in the fractional distillation of coal tar, and they may also be prepared synthetically. When prepared by distillation from coal tar or synthetically they are polymerized by means of heat or by mineral acids, preferably sulphuric acid. Sulphuric acid when added to a solution of these substances forms a polymerized resinous material. In the case of the polymerization of a coal tar distillate boiling between approximately 150° C. to 200° C. the polymerized material contains a mixture of Pará-cumaron, Pará-indene, metastyrene and the polymers of the homologues generally of cumaron and indene which occur in the coal tar distillate. A partially polymerized coal tar distillate is satisfactory for increasing the tackiness of rubber. The exact chemical composition varies with the source of the coal tar. Cumaron resin from whatever source it is obtained is contemplated as well as the individual components thereof such as Pará-indene. Coal tar distillate boiling outside the range of 150° C. to 200° C. yields polymerized resinous material suitable for the purposes of this invention. Pará-indene is believed to be the most valuable ingredient but similar polymerization products or mixtures are comprehended. To thicken the composition any of the gums or agents for the purpose above set forth may be employed, or glue or colloidal clays. To increase the penetrating power of the composition, and in lieu of sulphonated castor oil, any agent may be employed which is miscible with water and oils, greases, or waxes, such for instance as orthotoluidine, sodium sulphanilite, thiourea, sulphonated olive oil, and sulphonated cotton seed oil. Reference is therefore made to the accompanying claims for an understanding of the scope of the invention.

Having thus described my invention what I claim and desire to protect by Letters Patent is:—

1. An adhesive composition comprising an aqueous dispersion of rubber containing an emulsion of a resinous polymerization product of a coal tar distillate, said product containing cumaron resin.

2. An adhesive composition comprising an aqueous dispersion of rubber containing an emulsion of a resinous product containing Pará-indene.

3. An adhesive composition comprising an aqueous dispersion of rubber containing an emulsion of a resinous polymerization product of a fraction of a coal tar distillate boiling between approximately 150° C. and 200° C.

4. An adhesive composition comprising an aqueous dispersion of rubber containing an emulsion containing Pará-indene.

5. An adhesive composition comprising an aqueous dispersion of rubber containing an emulsion cumaron resin.

6. An adhesive composition comprising an aqueous dispersion of rubber containing an emulsion of cumaron resin, and a thickening agent for the aqueous dispersion.

7. An adhesive composition comprising an aqueous dispersion of rubber containing an emulsion of cumaron resin, and water soluble gum.

8. An adhesive composition comprising an aqueous dispersion of rubber containing an emulsion of cumaron resin, and Karaya gum.

9. An adhesive composition comprising rubber latex, Pará-indene and a water soluble gum.

10. An adhesive composition comprising rubber latex, emulsified cumaron resin, Karaya gum, and a water soluble oil.

11. An adhesive composition comprising rubber latex, emulsified cumaron resin, Karaya gum, and a water soluble sulphonated oil.

12. An adhesive composition comprising rubber latex, emulsified cumaron resin, Karaya gum, and water soluble sulphonated castor oil.

13. An adhesive composition comprising an aqueous dispersion of rubber containing an emulsion of the polymerization products of coal tar oils containing indene and its homologues.

14. An adhesive composition comprising an aqueous dispersion of rubber, polymerized material containing Pará indene, a thickening agent for the aqueous dispersion, and a water soluble oil.

Signed at New York, county and State of New York, this 15th day of September, 1924.

MERWYN C. TEAGUE.